United States Patent
Kayumi

(10) Patent No.: US 7,597,292 B2
(45) Date of Patent: Oct. 6, 2009

(54) ELECTRIC POWER FEEDING APPARATUS FOR SLIDE SEAT EQUIPPED WITH ELECTRIC DEVICE

(75) Inventor: Tetsuya Kayumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 810 days.

(21) Appl. No.: 11/339,064

(22) Filed: Jan. 25, 2006

(65) Prior Publication Data
US 2006/0185879 A1  Aug. 24, 2006

(30) Foreign Application Priority Data
Jan. 27, 2005 (JP) ............... 2005-019902

(51) Int. Cl.
*F16M 11/00* (2006.01)
(52) U.S. Cl. ............... 248/157; 439/34; 248/429
(58) Field of Classification Search ............... 439/34; 248/157, 429–430
See application file for complete search history.

(56) References Cited

U.S. PATENT DOCUMENTS

| | | | | |
|---|---|---|---|---|
| 4,460,217 A * | 7/1984 | Tsuda et al. ............ | 297/362.11 |
| 5,176,353 A * | 1/1993 | Aihara et al. ............... | 248/430 |
| 5,259,257 A * | 11/1993 | Mouri ......................... | 248/429 |
| 5,586,740 A * | 12/1996 | Borlinghaus et al. ........ | 248/157 |
| 5,904,394 A * | 5/1999 | Dilluvio et al. ............. | 296/121 |
| 7,082,720 B2 * | 8/2006 | Kobayashi et al. ............ | 49/360 |

FOREIGN PATENT DOCUMENTS

JP    2004-210084    7/2004

* cited by examiner

*Primary Examiner*—Truc T Nguyen
(74) *Attorney, Agent, or Firm*—Rankin, Hill & Clark LLP

(57) ABSTRACT

An electric power feeding apparatus for feeding electric power to an electric device installed in a vehicle slide seat and movable together with the slide seat as the slide seat slides along a slide rail includes a cable rail disposed in parallel juxtaposed relation to the slide rail with a clearance defined therebetween, a power feeding cable disposed in the cable rail and fixed at one end to the cable rail, an opposite free end portion of the power feeding cable being drawn out from the cable rail into the clearance and extending upward through the clearance toward the slide seat for electric connection with the electric device, and a support member extending downward from the slide seat into the clearance and supporting thereon the free end portion of the power feeding cable.

8 Claims, 5 Drawing Sheets

US 7,597,292 B2

ELECTRIC POWER FEEDING APPARATUS FOR SLIDE SEAT EQUIPPED WITH ELECTRIC DEVICE

FIELD OF THE INVENTION

The present invention relates to an electric power feeding apparatus for feeding electric power to an electric device installed in a vehicle slide seat and movable together with the slide seat as the slide seat slides along a slide rail relative to another seat disposed either in front of or behind the slide seat.

BACKGROUND OF THE INVENTION

Known electric power feeding apparatuses are arranged to receive a wiring harness or cable, connected to an electric device installed in a vehicle slide seat, so that the cable does not interfere with neighboring part during sliding movement of the seat. One example of such known apparatuses is disclosed in JP-A-2004-210084.

The disclosed electric power feeding apparatus, as shown in FIGS. 7A and 7B hereof, is used in conjunction with a vehicle slide seat 101 equipped with an electric device and sidable along a slide rail 103. The apparatus includes a cable rail 102 disposed adjacent the slide rail 103 on a vehicle floor, a power feeding cable 104 disposed inside the cable rail 102, a coupler 116 interconnecting a free end of the power feeding cable 104 and a cable 115 connected to the electric device, and a bracket arm 112 supporting the coupler 116 and attached to an upper member 111 of the slide rail 103. The free end of the power feeding cable 104 is drawn out from the cable rail 102 through a slit (not designated) formed in a top wall of the cable rail 102. To minimize an exposed area of the slit, seal covers 107, 108 are mounted to an upper part of the cable rail 102. The cable rail 102 is connected through a bracket plate 105 to the slide rail 103. A cover 106 extends over a space defined between the cable rail 102 and the slide rail 103.

With this arrangement, when the seat 101 slides along the slide rail 103, the free end of the power feeding cable 102 is movable together with the seat 101 while the power feeding cable 104 remains received inside the cable rail 102.

The known electric power feeding apparatus of the foregoing construction has a problem that the slit formed in the top wall of the cable rail 102 allows entry of foreign matter into the cable rail 102, which may hinder smooth flexing of the power feeding cable inside the cable rail during sliding movement of the seat 101. The seal covers 107, 108 are insufficient to address this problem. Furthermore, due to the provision of the seal covers 107, 108, the known electric power feeding apparatus has a relatively large number of parts to be assembled together, is relatively complicated in construction, and requires a relatively long assembly time

SUMMARY OF THE INVENTION

According to one aspect of the present invention, there is provided an electric power feeding apparatus for feeding electric power to an electric device installed in a vehicle slide seat and movable together with the slide seat as the slide seat slides along a slide rail relative to another seat disposed either in front of or behind the slide seat. The apparatus comprises a cable rail disposed in parallel juxtaposition with the slide rail with a clearance defined therebetween, a power feeding cable disposed in the cable rail and having one end portion fixed to the cable rail and a free end portion opposite to the fixed end portion, the free end portion of the power feeding cable being drawn out from the cable rail into the clearance and extending upward through the clearance toward the slide seat for electric connection with the electric device, and a support member extending downward from the slide seat into the clearance and supporting thereon the free end portion of the power feeding cable.

With the electric power feeding apparatus of the foregoing construction, it is possible to feed electric power through the apparatus to the electric device installed in the slide seat even when the seat slides along the slide rail.

Preferably, the cable rail has a hollow structure having a closed top and an open side facing the slide rail, the open side of the hollow cable rail having a longitudinal slit from which the free end portion of the power feeding cable is drawn into the clearance. The thus constructed cable rail can effectively prevent foreign matter from entering into the cable rail. Furthermore, since the upper side of the cable rail is closed, the power feeding cable received in the cable rail is kept in a concealed condition.

The electric power feeding apparatus may further include a flexible hollow cable guide received in the hollow cable rail and accommodating therewithin the power feeding cable. The cable cover has one end fixed to the cable rail together with the fixed end portion of the power feeding cable. An opposite end of the cable guide is connected to a distal end portion of the support member projecting from the longitudinal slit into the hollow cable rail. Preferably, the cable guide has a resilient cable clamp disposed at the opposite end thereof for resiliently urging the free end portion of the power feeding cable against the support member. The free cable end portion thus clamped is free from interference with the slide rail, ensuring smooth movement of the free cable end portion and the support member during the sliding of the slide seat.

The cable guide is preferably formed by a series of hollow links pivotally connected one another by pins, the cable guide being disposed in the cable rail with the pins disposed vertically. The thus-formed cable guide can bend or flex in a horizontal plane with the power feeding cable accommodated therewithin.

In one preferred form of the invention, the support member has a distal end portion projecting from the longitudinal slit into the hollow cable rail and directly connected to the free end portion of the power feeding cable. This arrangement can eliminate use of the cable guide, which leads to a reduction of production cost of the electric power feeding apparatus. The support member may further have a resilient cable clamp at the distal end portion thereof, the resilient clamp urging the free end portion of the power feeding cable against a surface of the support member facing the slide rail.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

Figure 1:
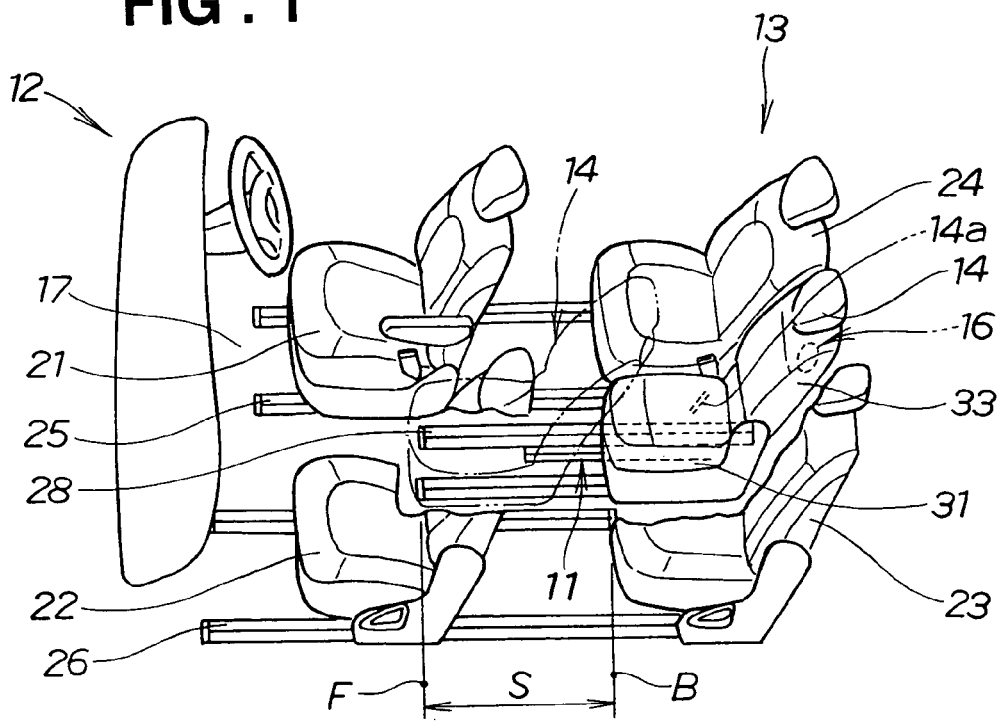
FIG. 1 is a view showing an electric power feeding apparatus used in conjunction with a vehicle slide seat equipped with an electric device according to the present invention.

Referring to FIG. 1, there is shown an electric power feeding apparatus 11 according to the present invention. The apparatus 11 is constructed to feed electric power to an electric device 16 installed in a central seat 14 of a second or rear seat row 13 of a vehicle 12 even when the seat 14 slides in a longitudinal direction of the vehicle to a desired position.

The vehicle 12 includes a driver's seat 21, a front passenger's seat 22, a left rear seat 23, the central rear seat 14 and a right rear seat 24. The seat 21 is sidable along a slide apparatus 25 disposed on a floor 17. The front passenger's seat 22 is also sidable along a slide apparatus 26 disposed on the floor 17.

The central rear seat 14 is sidable along a slide apparatus 28 disposed on the floor 17. The seat 14 includes a seat cushion 31, and a seat back 33 arranged to be reclined by a reclining apparatus (not shown). The seat back 33 is equipped with, for example, cup holders 83, 83 (FIG. 5) to be supplied with electric power from the electric power feeding apparatus 11. Each cup holder 83 constitutes the electric device 16. Reference character 14a denotes a connection device provided to the seat 14 for connecting the apparatus 11 to the electric device 16. The seat 14 is slidably movable between the fully advanced position F and the fully retreated position B. These positions F and B are spaced by a distance S.

Figure 2:
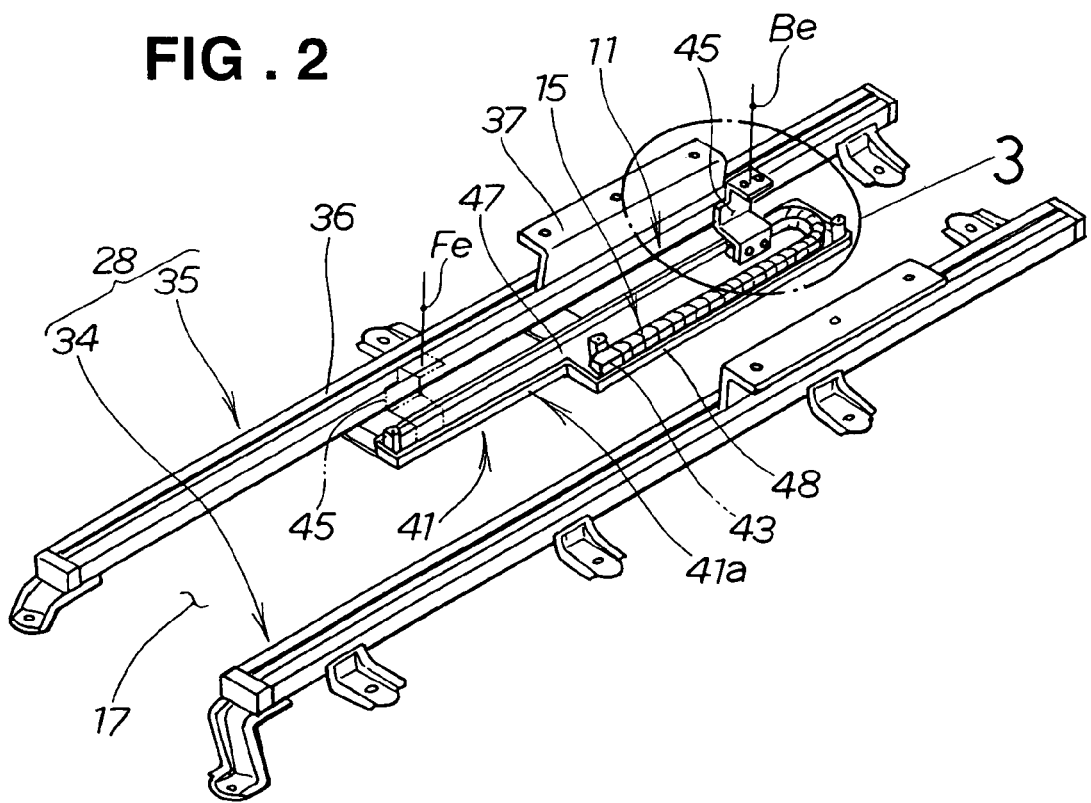
FIG. 2 is a perspective view showing the electric power feeding apparatus with a cable rail cover removed for clarity.

Turning to FIG. 2, the slide apparatus 28 includes a left rail mechanism 34 and a right rail mechanism 35. The right rail mechanism 35 includes a slide rail 36 fixed on the floor 17, a sliding leg member 37 slidably attached to the slide rail 36 and firmly connected to the bottom of the seat 14, and a locking member (not shown) for locking the sliding leg member 37 in a desired position. The left rail mechanism 34 has the same arrangement as the right rail mechanism 35 and hence its description will be omitted.

The electric power feeding apparatus 11 includes a cable rail 41 disposed on the floor 17 in side-by-side or parallel juxtaposed relation to the slide rail 36, a power feeding cable 15 disposed in the cable rail 41 and having one end portion 43 fixed to the cable rail 41 and a free end portion 44 (FIGS. 3 and 4) opposite to the fixed end portion 43, and a support member 45 associated with the power feeding cable 15 for supporting the free end portion 44 of the power feeding cable 15. The support member 45 is connected at one end (upper end) to the bottom of the seat 14 and supports thereon the free end portion 44 of the power feeding cable 15. The free cable end portion 44 is connected via the connection device 14a (FIG. 1) to the electric device 16 installed in the seat 14. In the illustrated embodiment, the support member 45 is movable, with the free cable end portion 44 supported thereon, between a fully advanced position Fe and a fully retreat position Be.

The cable rail 41 has a hollow structure and includes a flat elongated dish-like body 41a open upward, and a cover 49 (FIG. 4) fitted over the cable rail body 41a to close an upper side of the cable rail body 41a. The cable rail body 41a includes a guide portion 47 disposed adjacent to the slide rail 36 for guiding therealong a moving part of the power feeding cable 15 during sliding movement of the seat 14 (FIG. 1), and a receptacle portion 48 disposed away from the slide rail 36 for receiving therein a stationary part of the power feeding cable 15 during the sliding movement of the seat 14.

Figure 3:
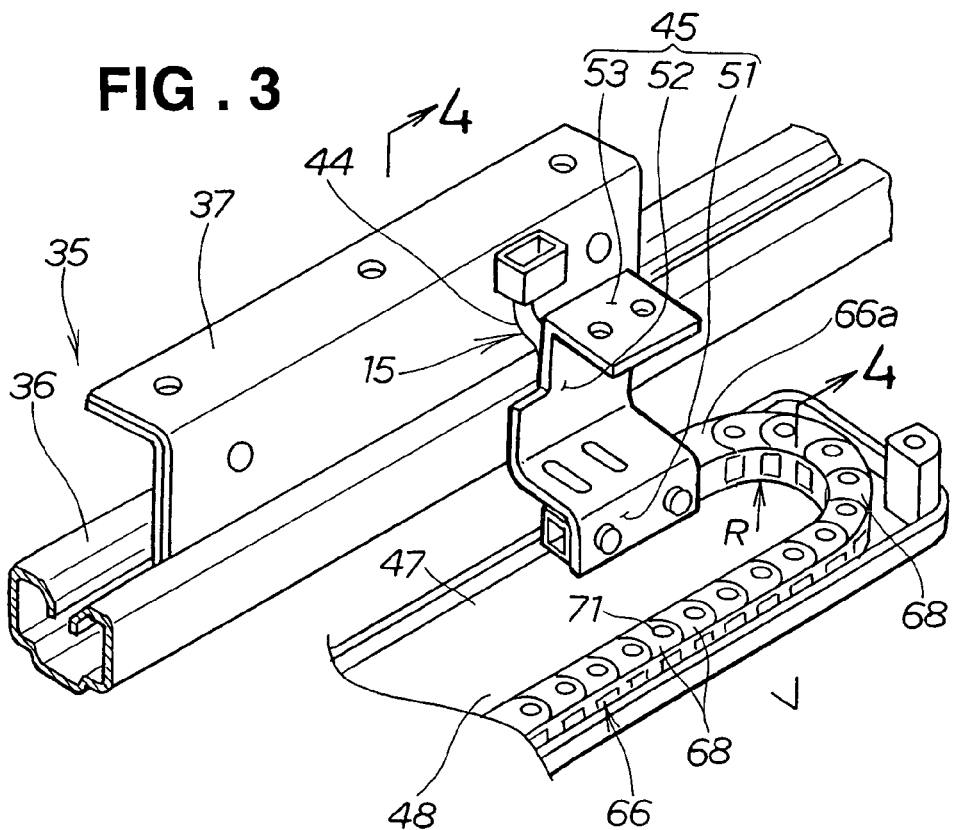
FIG. 3 is an enlarged view of a portion indicated by a circle 3 shown in FIG. 2.
Figure 4:
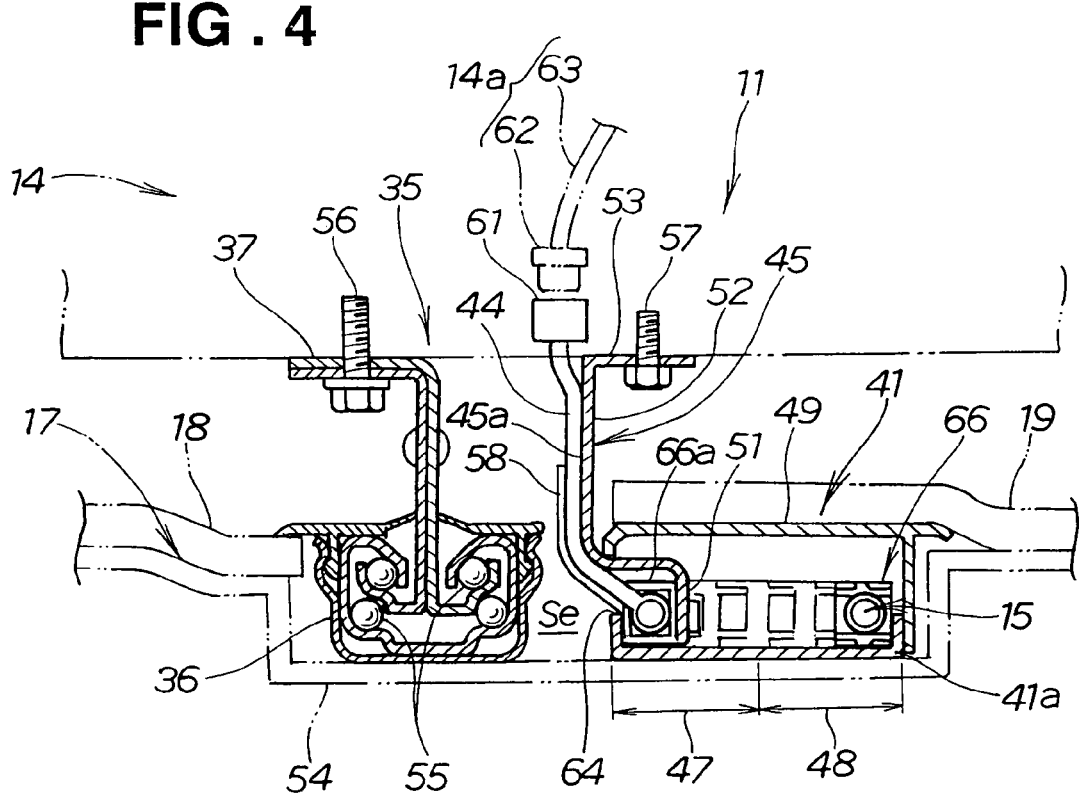
FIG. 4 is a cross-sectional view taken along line 4-4 of FIG. 3.

As shown in FIGS. 3 and 4, the support member 45 has an attachment portion 51 at a lower end (distal end) thereof, a mounting flange 53 at an upper end (proximal end), and a central body portion 52 extending between the attachment portion 51 and the mounting flange 53. The mounting flange 53 is secured by a pair of screws 57 (only one shown in FIG. 4) to the bottom of the central seat 14. The attachment portion 51 is connected to an end portion 66a of a flexible hollow cable guide 66 in which the power feeding cable 15 is accommodated except the free end portion 44. The mounting flange 53 is vertically aligned with the end portion 66a of the cable guide 66.

The cable guide 66 is disposed inside the cable rail 41 and fixed at an opposite end to the cable rail 41 together with the fixed end portion 43 (FIG. 2) of the power feeding cable 15. The cable guide 66 is formed by a series of hollow links 68 pivotally connected one another by pins 71. The cable guide 66 is disposed in the cable rail 41 with the pins 71 disposed vertically, so that the cable guide 66 can bend or flex in a horizontal plane with the power feeding cable 15 accommodated therein. In the illustrated embodiment, the cable guide 66 is laid to bend or turn at a given radius of curvature R (FIG. 3).

As shown in FIG. 4, the slide rail 36 of the right rail mechanism 35 is disposed in a groove 54 formed in the floor 17 so that the slide rail 36 does not protrude to an upper level than a right mat 18 placed on the floor 17. The sliding leg member 37 is sidably mounted in the slide rail 36 via balls 55. The sliding leg member 37 is attached to the bottom of the central seat 14 by means of screws 55 (only one shown), such that the seat 14 can move along the slide rail 36.

The cable rail 41 is disposed in the groove 54 in parallel juxtaposed relation to the slide rail 36 with a clearance Se defined therebetween. A top of the cable rail 41 is covered by a mat 19. The cable rail 41 has a longitudinal slit 64 formed in a side thereof facing the slide rail 36. The slit 64 is defined between a side edge of the cover 49 and a recessed side edge of the cable rail body 41a. The distal end portion (lower end portion) including the attachment portion 51 of the support member 45 extends through the slit 64 into the hollow cable rail 41 for connection of the attachment portion 51 and the end portion 66a (FIG. 3) of the cable guide 66. The free end portion 44 of the power feeding cable 15 is drawn out from the cable rail 41 through the slit 64 into the clearance Se and extends upward through the clearance Se toward the central seat 14 for electric connection with the electric device 16 (FIG. 1). The free end cable end portion 44 is supported on a surface 45a of the support member 45 facing the slide rail 36.

The cable guide 66 has a resilient cable clamp 58 disposed at the end portion 66a thereof for resiliently urging the free end portion 44 of the power feeding cable 15 against the surface 45a of the support member 45. The cable clamp 58 projects outward from the cable rail 41 through the slit 64 into the clearance Se. The slit 64 has a length long enough to allow movement of the free end portion 44 of the power feeding cable 15 and the support member 45 in a longitudinal direction of the cable rail 41 between the fully advanced position Fe (FIG. 2) and the fully retreated position Be.

Since the slit 64 is formed in a side of the hollow cable rail 41 and the cover 49 closes an upper side of the hollow cable rail 41, it is possible to prevent foreign matter including dust and dirt from entering into the cable rail 41. Furthermore, by virtue of the cable clamp 58, the free end portion 46 of the power feeding cable 15 is held in position on the support member 45 against interference with the slide rail 36. Thus, the free end portion 46 of the power feeding cable 15 can move smoothly without being damaged by the slide rail 36 when the seat 14 moves along the slide rail 36.

The connection device 14*a* includes a male connector or plug 62 provided at one end of a cable 63, the opposite end of the cable 63 being electrically connected to the electric device 6 (FIG. 1) installed in the central seat 14. The free end portion 44 of the power feeding cable 15 is terminated with a female connector or socket 61. The socket 61 is mated with the plug 62 so that electric power can be supplied though the power feeding cable 15 to the electric device 16 (FIG. 1).

Figure 5A:
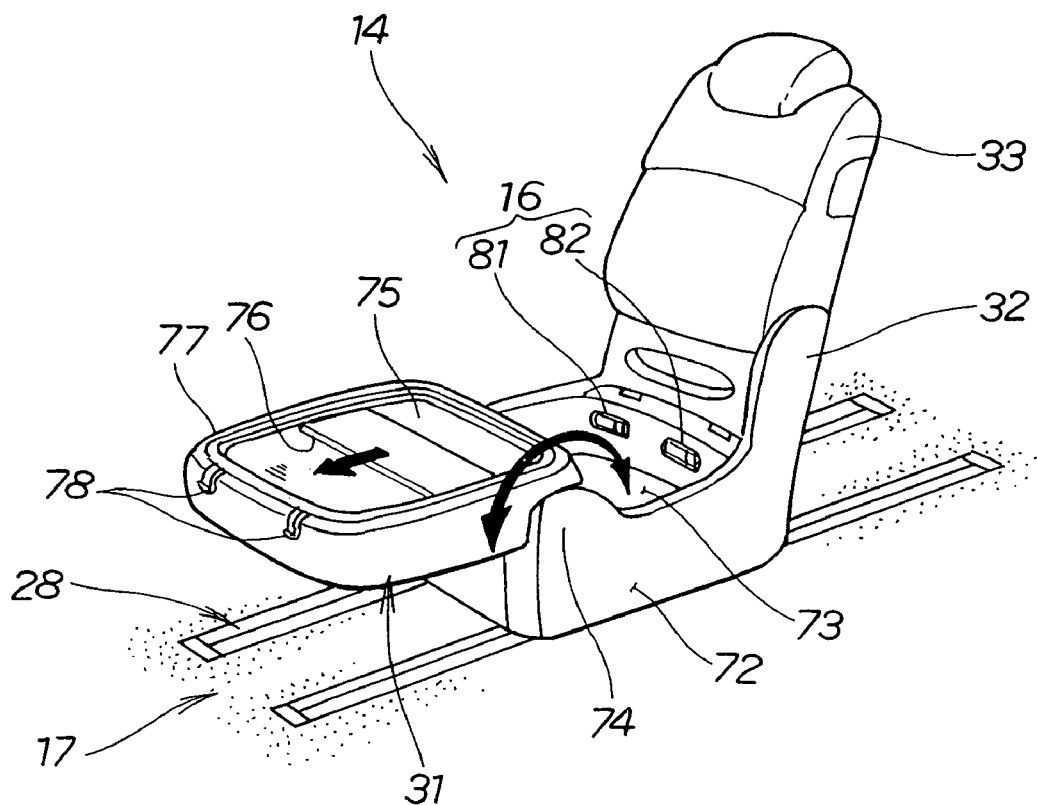
FIG. 5A is a perspective view showing the slide seat with a seat cushion overturned forwardly to allow access to the electric device installed in the slide seat.

Referring to FIG. 5A, the central seat 41 includes a frame 72 to which the sliding leg member 37 (FIG. 4) of the slide apparatus 28 and the mounting flange 53 (FIG. 4) of the support member 45 are connected, and the seat cushion 31 attached to the frame 72 in such a manner that the seat cushion 31 is pivotable about a front end portion 74 of the frame 72 through 180 degrees as indicated by arrowheads shown in FIG. 5A. The frame 72 has a storage portion 73. The seat cushion 31 has a recessed bottom 77 defining a storage portion 75, and a sliding lid 76 sidable along opposed lateral edges of the seat cushion 31. The bottom 77 of the seat cushion 31 carries thereon a pair of hooks 78, 78 for catching thereon bags and the like when the seat cushion 31 is overturned in a forward direction as shown in FIG. 5A. The electric device 16 includes a switch 81 and a video input terminal 82, which are provided to the storage portion 73 of the frame 72.

Figure 5B:
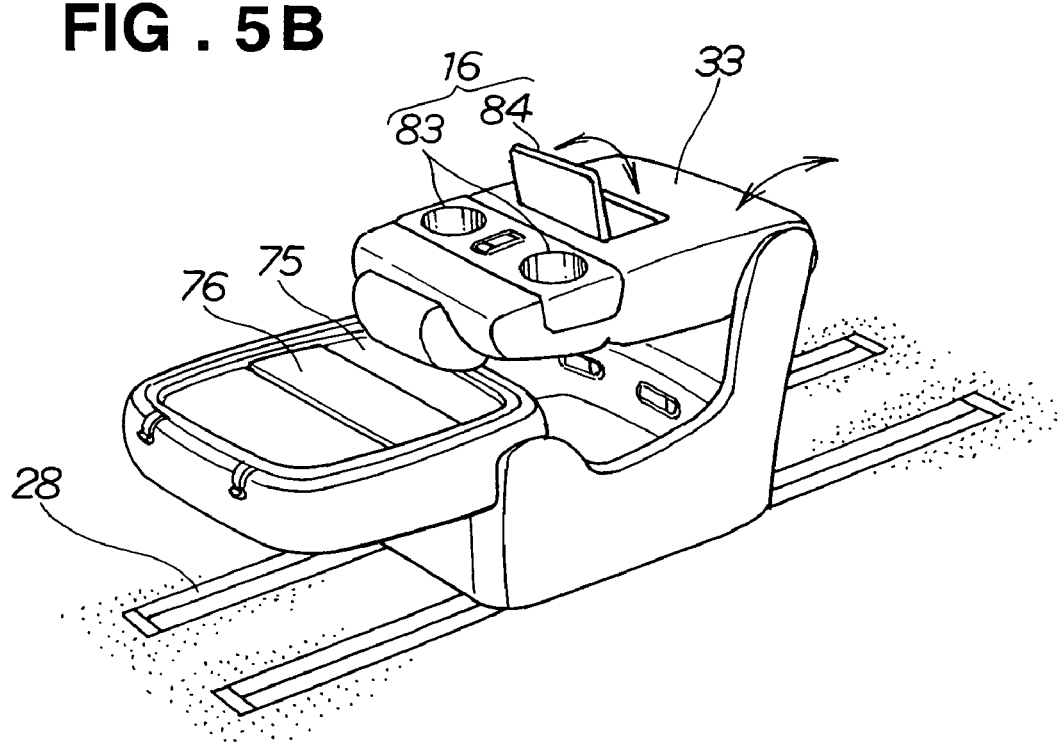
FIG. 5B is a view similar to FIG. 5A, but showing the slide seat with a seat back folded forward to allow access to another electric device installed in the slide seat.

As shown in FIG. 5B, the seat back 33 of the central seat 14 is pivotally connected to a rear end portion 32 of the frame 72 so that the seat back 33 can be folded over the sitting position of the seat cushion 31. The seat back 33 is equipped with the cup holders 83, 83 for holding cups (not shown) and a display 84, which constitute the electric device. The cup holders 83, 83 can have two operations for keeping drink in the cups hot and for keeping the drink cold. The two operations are switched by the switch 81 (FIG. 5A).

Since the support 45 interconnects the free end portion 44 of the power feeding cable 15 and the seat 14, the free cable end portion 44 can move the seat 14 when the seat 14 slides along\the slide rail 36. Thus, the power feeding cable requires no additional member for attachment of the cable free end portion 44 to the central seat 14.

Furthermore, since the cable rail 41 and the cover 49 are disposed in the groove 54 under the left mat 19, the cable guide 66 accommodating within it the power feeding cable 15 is not exposed to view even during sliding movement of the seat 14. Thus the electric power feeding apparatus 11 can feed electric power to the electric device 16 installed in the seat 14 while the cable guide 66 is kept in a concealed condition within the cable rail 41.

Figure 6:
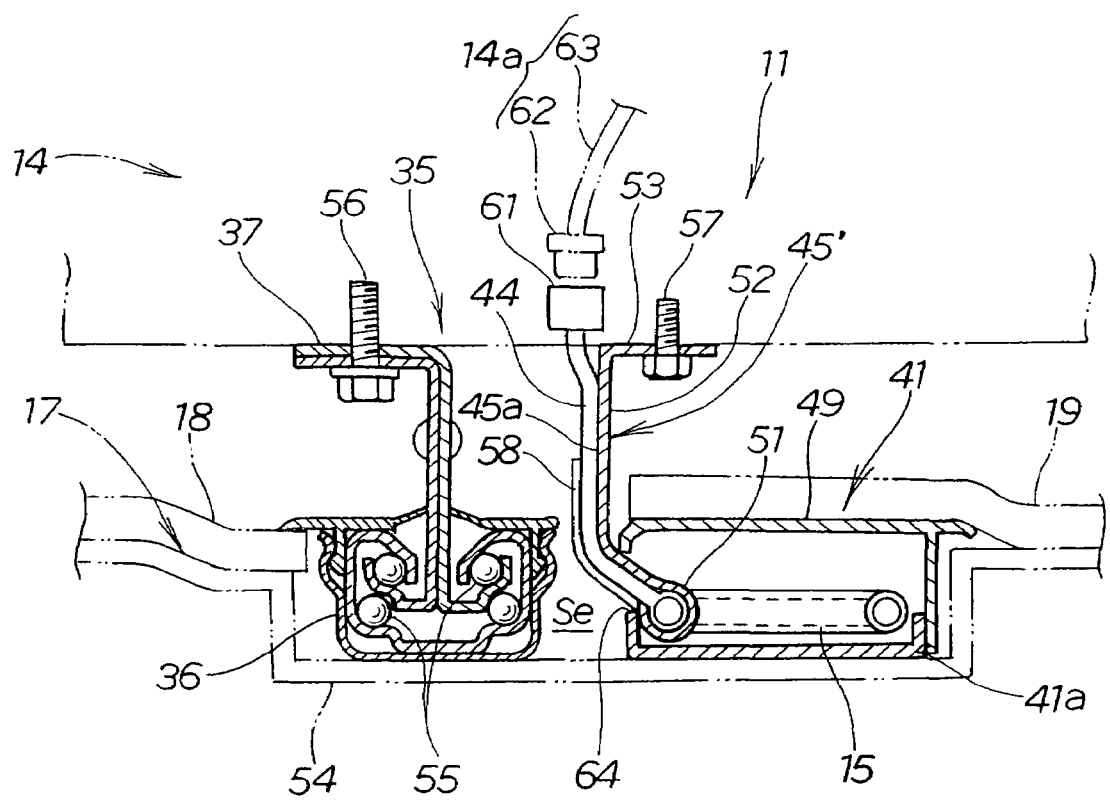
FIG. 6 is a view similar to FIG. 5B, but showing a modification according to the present invention.
Figure 7A:
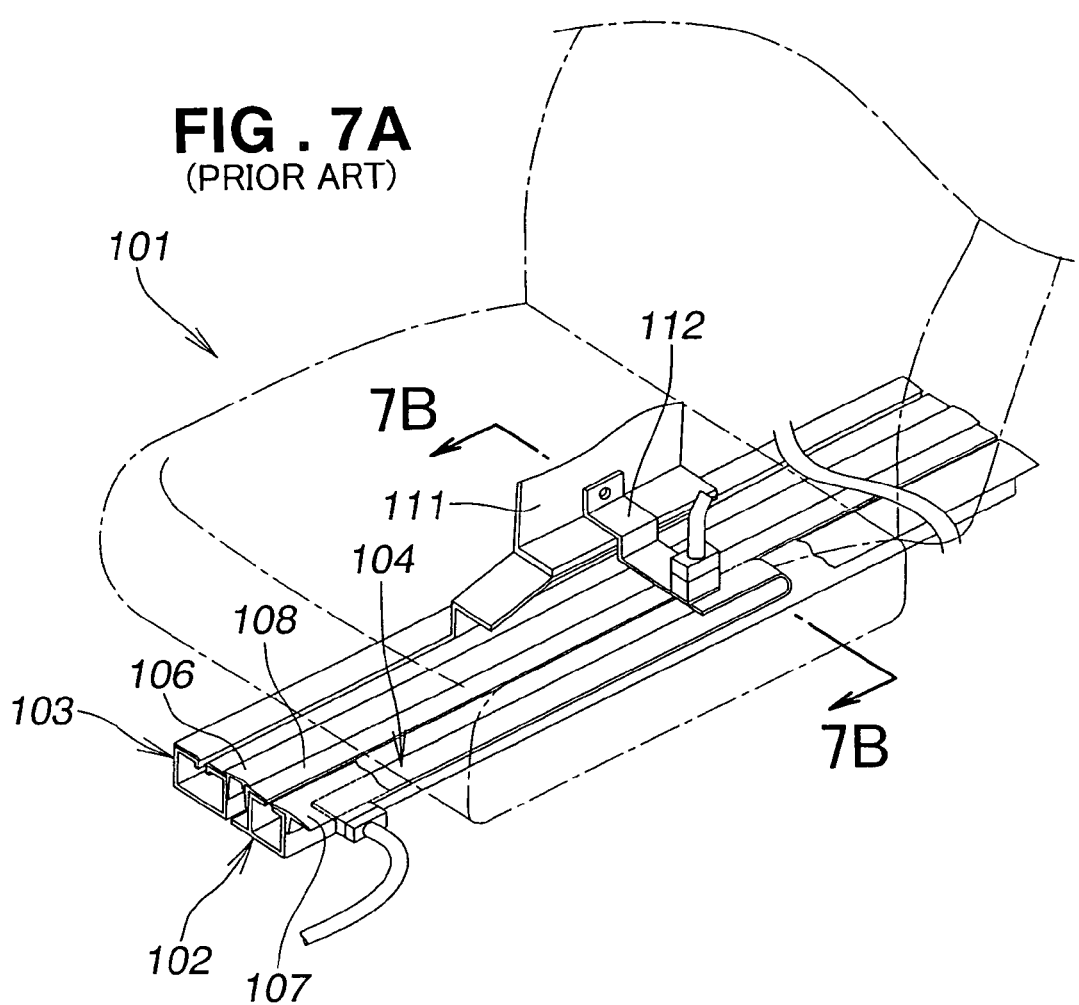
FIG. 7A is a perspective view of a conventional electric power feeding apparatus.
Figure 7B:
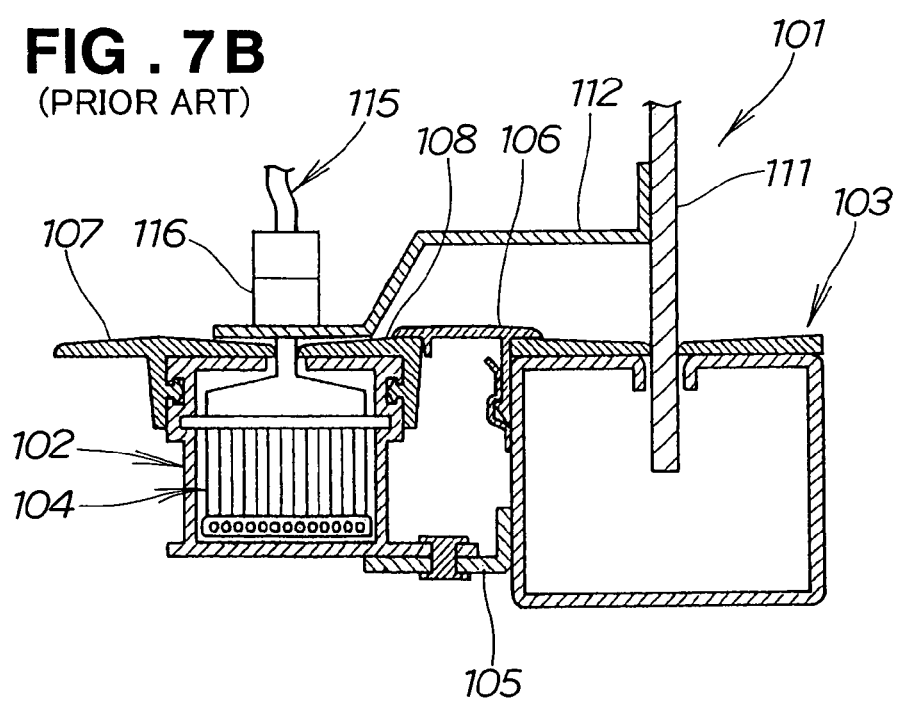
FIG. 7B is a cross-sectional view taken along line 7B-7B of FIG. 7A.

Obviously, various minor changes and modifications of the present invention are possible in the light of the above teaching. For example, the flexible cable guide 66 can be omitted in which instance the free end portion 44 of the power feeding cable 15 is directly connected to the distal end (lower end portion) of the support member 45' for movement therewith, as shown in FIG. 6. The support member 45' supports the free cable end portion 44 on a surface 45*a* thereof facing the slide rail 36. The support member 45' may have a resilient cable clamp 58 formed integrally with the lower end portion thereof and urging the free cable end portion 44 against the surface 45*a* of the support member 45'.

What is claimed is:

1. An electric power feeding apparatus for feeding electric power to an electric device installed in a vehicle slide seat and movable together with the slide seat as the slide seat slides along a slide rail relative to another seat disposed either in front of or behind the slide seat, the apparatus comprising:
    a cable rail disposed in parallel juxtaposed relation to the slide rail with a clearance defined therebetween;
    a power feeding cable disposed in the cable rail and having one end portion fixed to the cable rail and a free end portion opposite to the fixed end portion, the free end portion of the power feeding cable being drawn out from the cable rail into the clearance and extending upward through the clearance toward the slide seat for electric connection with the electric device; and
    a support member extending downward from the slide seat into the clearance and supporting thereon the free end portion of the power feeding cable.

2. The electric power feeding apparatus according to claim 1, wherein the cable rail has a hollow structure having a closed top and an open side facing the slide rail, the open side of the hollow cable rail having a longitudinal slit from which the free end portion of the power feeding cable is drawn into the clearance.

3. The electric power feeding apparatus according to claim 2, further comprising a flexible hollow cable guide received in the hollow cable rail and accommodating therewithin the power feeding cable, the cable cover having one end fixed to the cable rail together with the fixed end portion of the power feeding cable, wherein the support member has a distal end portion projecting from the longitudinal slit into the hollow cable rail and connected to an opposite end of the cable guide.

4. The electric power feeding apparatus according to claim 3, wherein the cable guide has a resilient cable clamp disposed at the opposite end thereof for resiliently urging the free end portion of the power feeding cable against the support member.

5. The electric power feeding apparatus according to claim 3, wherein the cable guide includes a series of hollow links pivotally connected one another by pins, the cable guide being disposed in the cable rail with the pins disposed vertically.

6. The electric power feeding apparatus according to claim 1, wherein the support member has a surface facing the slide rail, the free end portion of the power feeding cable being supported on the surface of the support member.

7. The electric power feeding apparatus according to claim 2, wherein the support member has a distal end portion projecting from the longitudinal slit into the hollow cable rail and directly connected to the free end portion of the power feeding cable.

8. The electric power feeding apparatus according to claim 7, wherein the support member further has a resilient cable clamp at the distal end portion thereof, the resilient clamp urging the free end portion of the power feeding cable against a surface of the support member facing the slide rail.

* * * * *